(12) United States Patent  (10) Patent No.: US 6,388,775 B1
Chiu  (45) Date of Patent: May 14, 2002

(54) IMAGE SCANNER WITH AN AUTOMATIC DOCUMENT FEEDER AND A MOVABLE LIGHT SOURCE

(75) Inventor: Chung-Jung Chiu, Taipei (TW)

(73) Assignee: Ultima Electronics Corp., Chung-Ho (TW)

( * ) Notice: Subject to any disclaimer, the term of this patent is extended or adjusted under 35 U.S.C. 154(b) by 0 days.

(21) Appl. No.: 09/298,554

(22) Filed: Apr. 22, 1999

(30) Foreign Application Priority Data

Jan. 8, 1999 (TW) .......................................... 88100223

(51) Int. Cl.[7] ............................................... H04N 1/04
(52) U.S. Cl. ....................... 358/474; 358/496; 358/497; 358/498; 358/487
(58) Field of Search ................................ 358/474, 487, 358/475, 497, 496, 498, 471, 505, 506, 509; 250/234, 208.1; 399/367, 379, 211, 380

(56) References Cited

U.S. PATENT DOCUMENTS

| | | | | |
|---|---|---|---|---|
| 5,781,311 A | * | 7/1998 | Inoue et al. ................. | 358/475 |
| 5,898,508 A | * | 4/1999 | Bekanich ..................... | 358/474 |
| 6,057,936 A | * | 5/2000 | Obara et al. ................. | 358/296 |
| 6,172,774 B1 | * | 1/2001 | Yamashita ................... | 358/474 |
| 6,185,011 B1 | * | 2/2001 | William ....................... | 358/474 |

* cited by examiner

Primary Examiner—Cheukfan Lee
(74) Attorney, Agent, or Firm—Winston Hsu

(57) ABSTRACT

The present invention provides an image scanner comprising an automatic document feeder and a moveable light source. The image scanner uses a sensing device to detect the position of a lid, and uses a switch mechanism to control the power output of a motor. When the lid is at an "on" position, the power output of the motor will be transmitted to the automatic document feeder to scan opaque documents. When the lid is at an "off" position, the power output of the motor will be transmitted to the light source to scan transparent documents. The transparent documents can be scanned without additional locating devices to locate transparent documents thus making the image scanner multi-functional and easy to use.

8 Claims, 8 Drawing Sheets

IMAGE SCANNER WITH AN AUTOMATIC DOCUMENT FEEDER AND A MOVABLE LIGHT SOURCE

BACKGROUND OF THE INVENTION

1. Field of the Invention

The present invention relates to an image scanner, and more particularly, to an image scanner with an automatic document feeder and a movable back light source.

2. Description of the Prior Art

Nowadays, image scanners are becoming essential in the office for scanning opaque documents and transparent documents. A typical image scanner comprises a housing with a transparent platform installed on its top for placing a document to be scanned, and a flat panel rotationally connected to the housing. During scanning of a document, the flat panel is lifted away from the transparent platform of the housing, the document is placed on the transparent platform, and then the flat panel is attached to the transparent platform of the housing. This time-consuming process must be repeated several times when many documents are to be scanned. This wastes time. Although some of the image scanners can be equipped with an additional device such as an automatic document feeder for feeding documents or a back light panel for scanning transparent documents, this can become very cumbersome. Moreover, most image scanners can only scan either opaque documents or transparent documents. A dual functional scanner which scans both types of documents requires different locating devices to locate transparent documents of various sizes and is very inconvenient to use. A multi-functional image scanner has a very complex structure and is connected to many components thus making the image scanner very complicated.

SUMMARY OF THE INVENTION

It is therefore an objective of the present invention to provide an image scanner with an automatic document feeder and a movable back light source to solve the above mentioned problems.

In a preferred embodiment, the present invention provides an image scanner comprising:
- a lower casing having a lower transparent platform on its top for placing a document to be scanned wherein the lower transparent platform can be divided into two separate parts, namely a first part and a second part;
- a scanning module moveably installed inside the lower casing for scanning the document;
- an upper casing rotationally connected to the lower casing and having an upper transparent window on its bottom wherein when the upper transparent window of the upper casing is physically attached to the lower transparent window of the lower casing, the upper transparent window is positioned above the first part of the lower transparent platform;
- a light source moveably installed inside the upper casing and placed above the upper transparent window for providing back light to the document;
- an automatic document feeder installed inside the upper casing for carrying documents to be scanned through the second part of the lower transparent platform wherein the automatic document feeder comprises a lid rotationally installed on the upper casing and a sensing device for detecting the position of the lid; and
- a control circuit for controlling operations of the image scanner;

wherein when the control circuit senses that the lid is at an "on" position through the sensing device, the scanning module will be moved to a position under the second part of the lower transparent platform such that the documents carried through the second part of the lower transparent platform by the automatic document feeder can be scanned, and when the control circuit senses that the lid is at an "off" position, the light source and the scanning module will be moved under the control of the control circuit to scan a document placed on the first part of the lower transparent platform.

It is an advantage of the present invention that the power output of the motor is transmitted to the automatic document feeder to scan opaque documents and transmitted to the movable light source to scan transparent documents thus making the image scanner multi-functional and easy to use.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
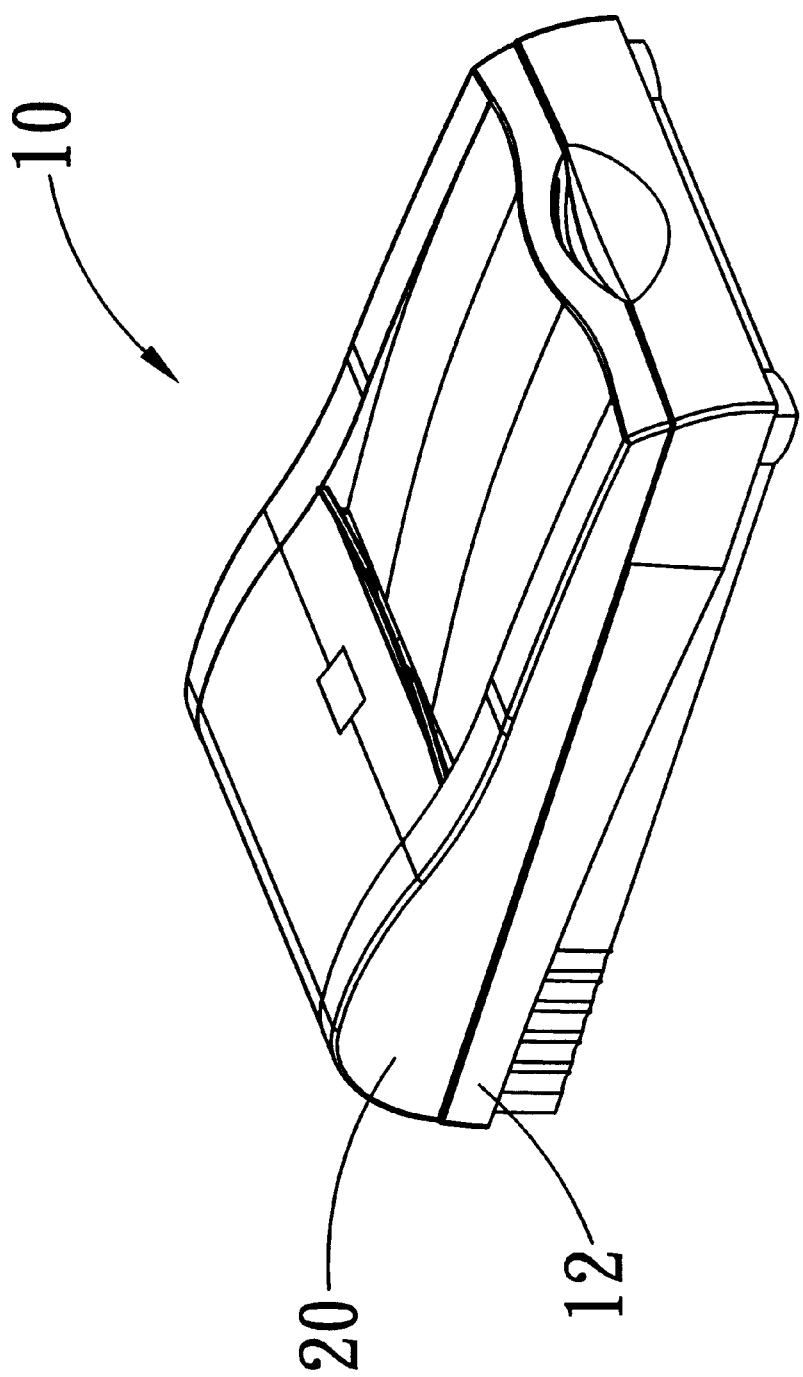
FIG. 1 is a perspective view of an image scanner according to the present invention.
Figure 2:
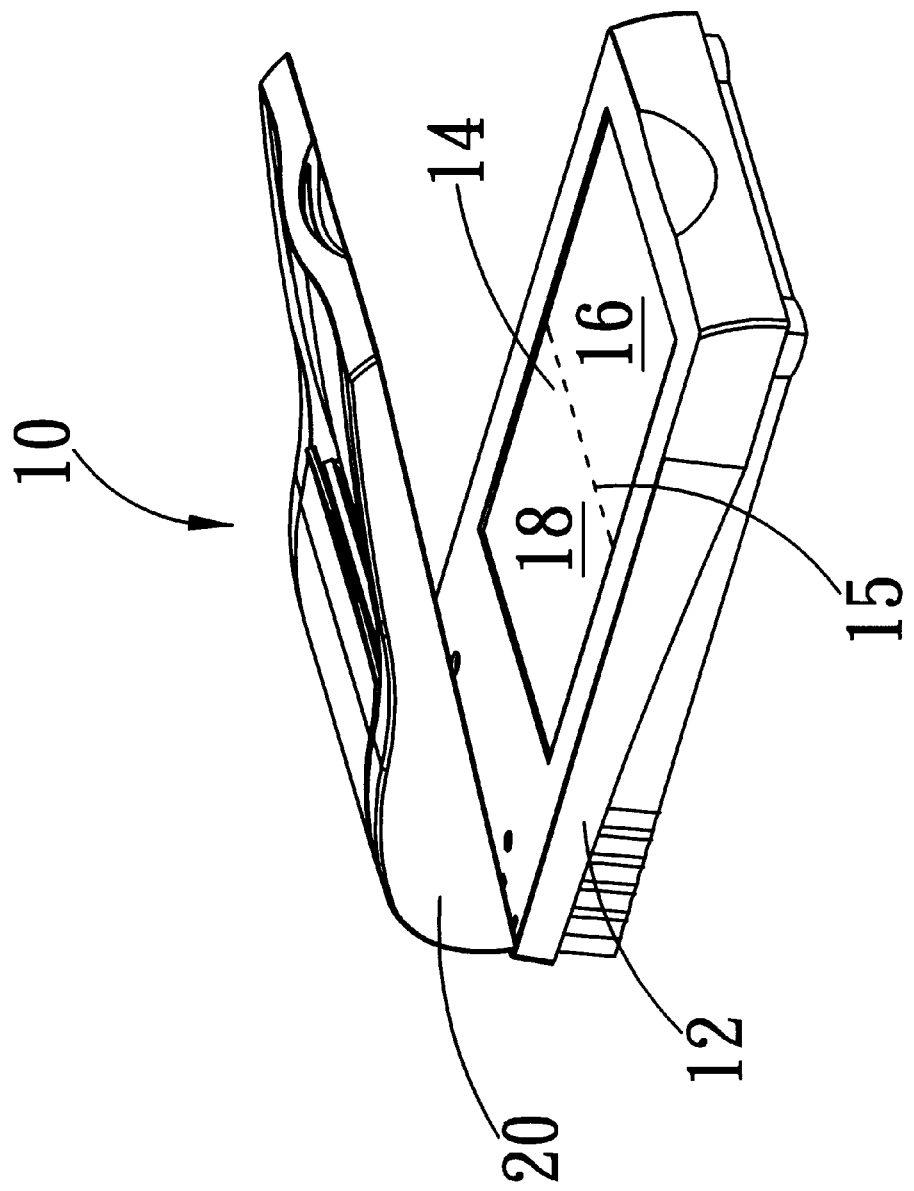
FIG. 2 is a perspective view of the image scanner in FIG. 1 with the upper casing in an opened position.
Figure 3:
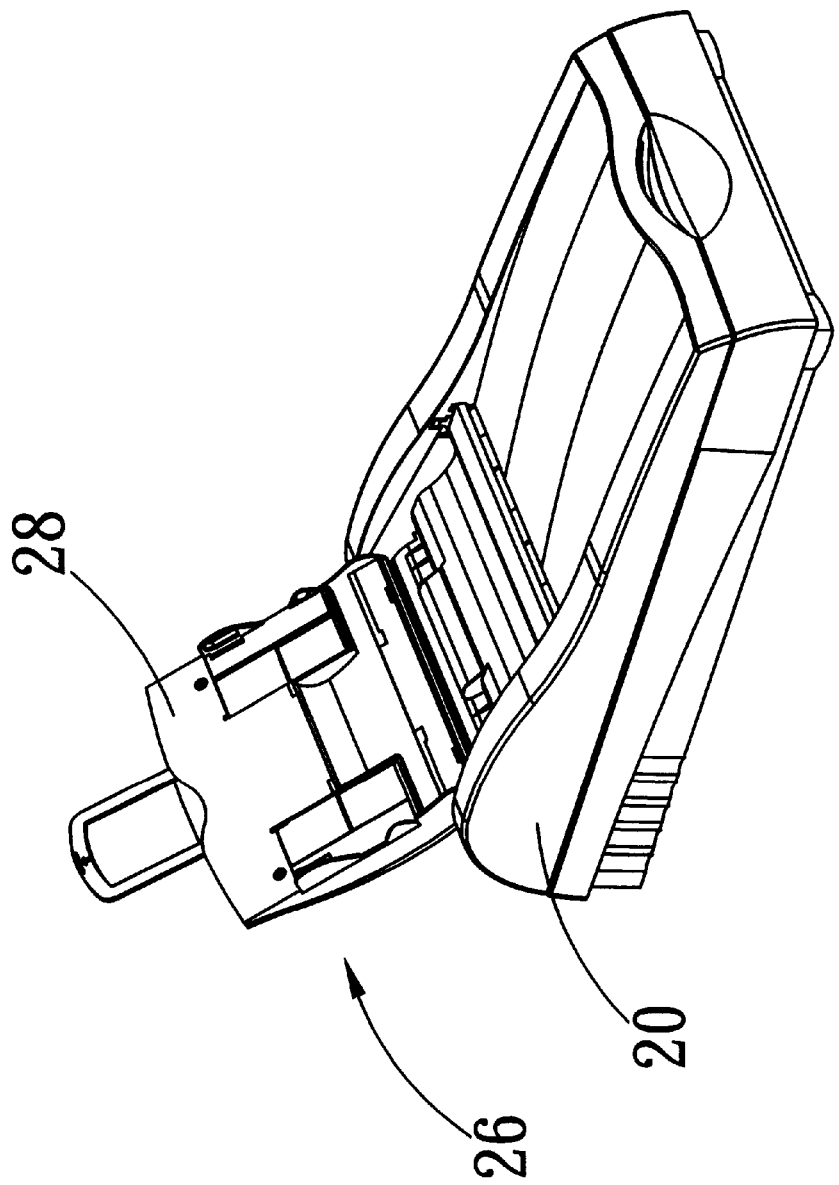
FIG. 3 is a perspective view of the image scanner in FIG. 1 with the lid at an "on" position.
Figure 4:
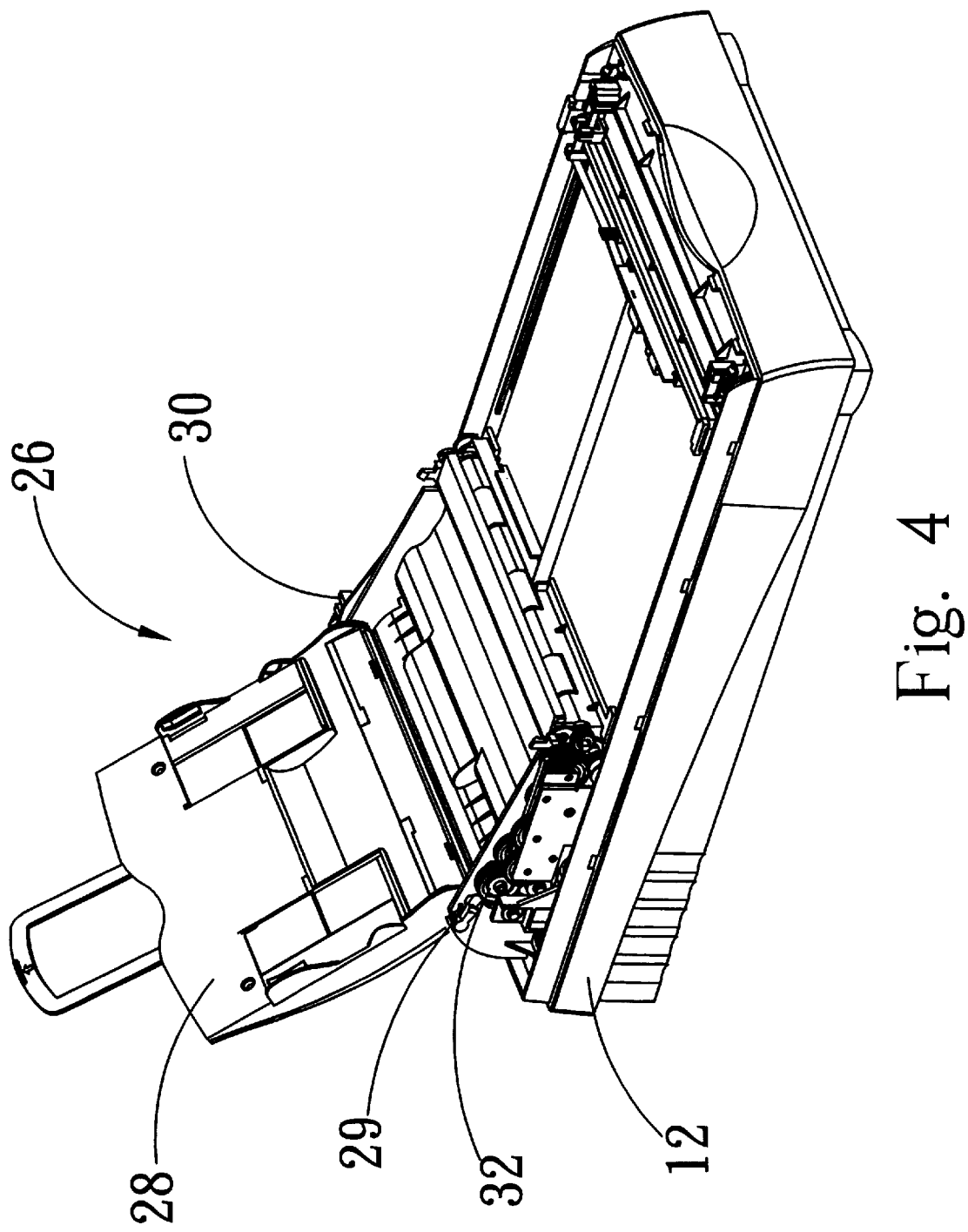
FIG. 4 is a component diagram of the image scanner in FIG. 1.

Please refer to FIGS. 1 to 4. FIG. 1 is a perspective view of an image scanner 10 according to the present invention. FIG. 2 is a perspective view of the image scanner 10 when an upper casing 20 of the scanner 10 is in an opened position. FIG. 3 is a perspective view of the image scanner 10 when a lid 28 of the scanner 10 is at an "on" position. FIG. 4 is a component diagram of the image scanner 10.

The image scanner 10 comprises a lower casing 12, an upper casing 20, a scanning module (not shown), a light source (not shown), an automatic document feeder 26, and a control circuit (not shown). The lower casing 12 has a lower transparent platform 14 on its top for placing a document to be scanned. The lower transparent platform 14 can be divided into a first part 16 and a second part 18 along a dotted line 15. The upper casing 20 is rotationally connected to the lower casing 12 and has an upper transparent window (not shown) on its bottom. When the upper transparent window of the upper casing 20 is physically attached to the lower transparent window 14 of the lower casing 12, the upper transparent window is positioned above the first part 16 of the lower transparent platform 14. The scanning module is moveably installed inside the lower casing 12 for scanning the document. The light source is moveably installed inside the upper casing 20 and placed above the upper transparent window for providing back light to the document.

The automatic document feeder 26 is installed inside the upper casing 20 for carrying documents to be scanned through the second part 18 of the lower transparent platform 14. The automatic document feeder 26 comprises a lid 28 rotationally installed on the upper casing 20, a sensing device 30 for detecting the position of the lid 28, a motor (not shown) for moving the document to be scanned and the light source, and a switch mechanism 32 for switching the power output of the motor. The lid 28 comprises a flange 29 installed on one side to actuate the switch mechanism 32.

When the lid 28 is switched to an "on" position as shown in FIG. 3, it will actuate the switch mechanism 32 to transmit the power output of the motor to the automatic document feeder 26 to carry the documents to be scanned through the second part 18 of the lower transparent platform 14. When the lid 28 is switched to an "off" position, it will actuate the switch mechanism 32 to transmit the power output of the motor to the light source.

The control circuit is used for controlling operations of the image scanner 10. When the control circuit senses that the lid 28 is at the "on" position through the sensing device 30, the scanning module will be moved to a position under the second part 18 of the lower transparent platform 14 such that the documents carried through the second part 18 of the lower transparent platform 14 by the automatic document feeder 26 can be scanned. When the control circuit senses that the lid 28 is at the "off" position, the light source and the scanning module will be moved under the control of the control circuit to scan a document placed on the first part 16 of the lower transparent platform 14.

The image scanner 10 can be used to scan both opaque and transparent documents. When scanning an opaque document, a user has to switch the lid 28 to the "on" position and place the document in the automatic document feeder 26. When scanning a transparent document, the user has to switch the lid 28 to the "off" position, place the document on the lower transparent platform 14 and cover the upper casing 20. The position of the lid 28 will cause the switch mechanism 32 and sensing device 30 to respond accordingly thus operating in a different scanning mode. The following context explains operations of the switch mechanism 32 and the sensing device 30.

Figure 5:
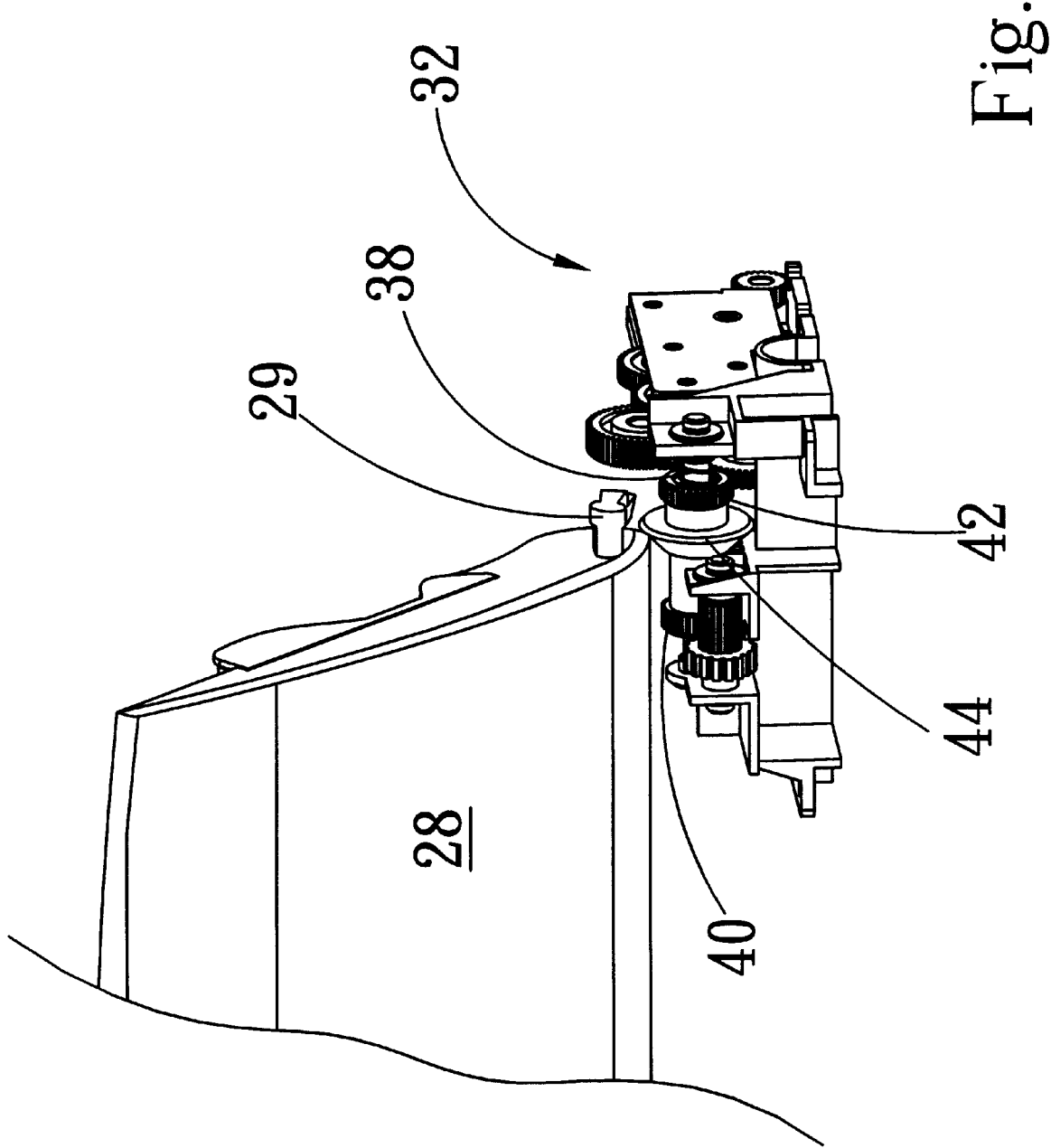
FIG. 5 is a perspective view of the switch mechanism in FIG. 3 with the lid at the "on" position.
Figure 6:
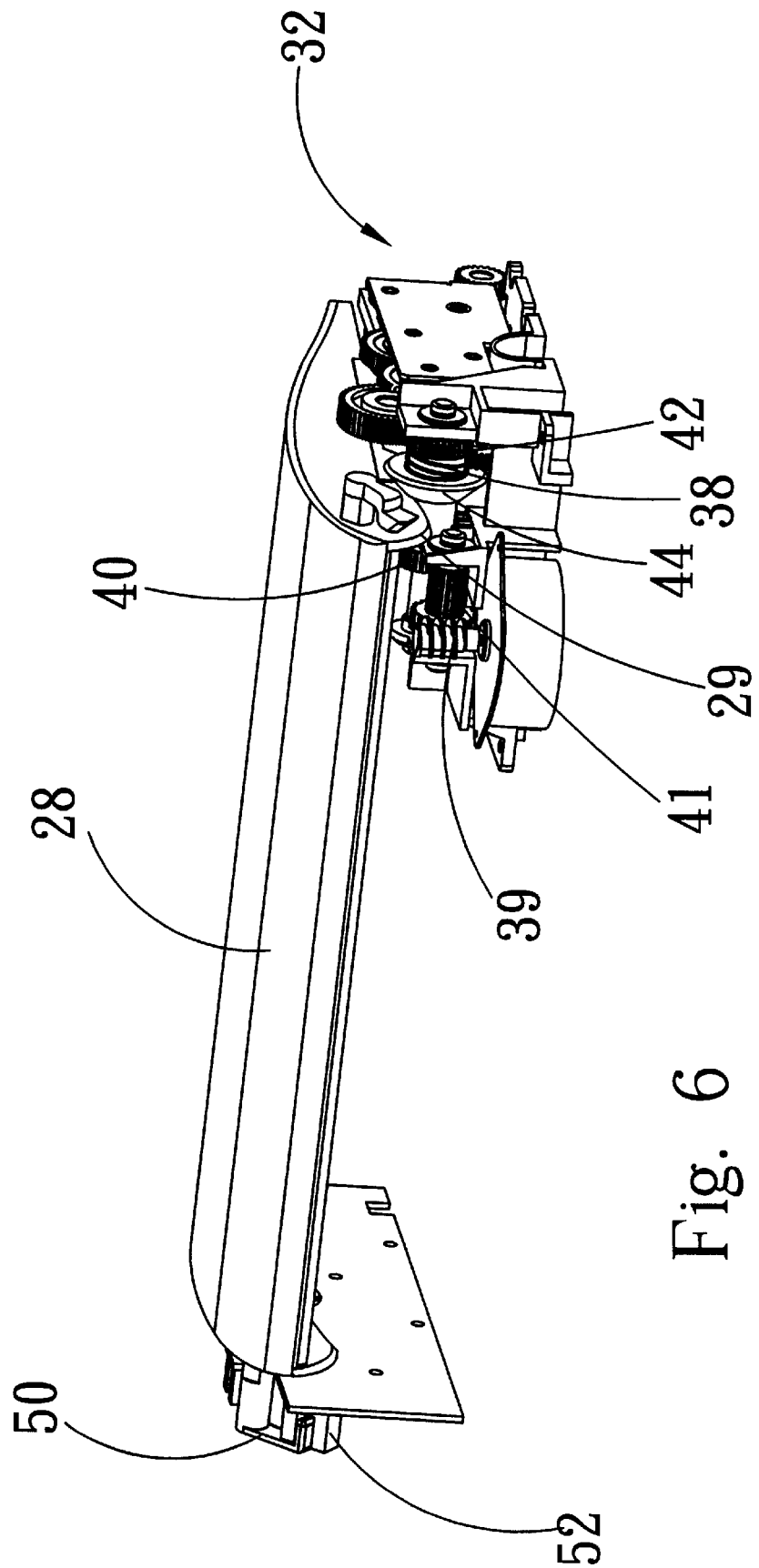
FIG. 6 is a perspective view of the switch mechanism in FIG. 3 with the lid at an "off" position.
Figure 7:
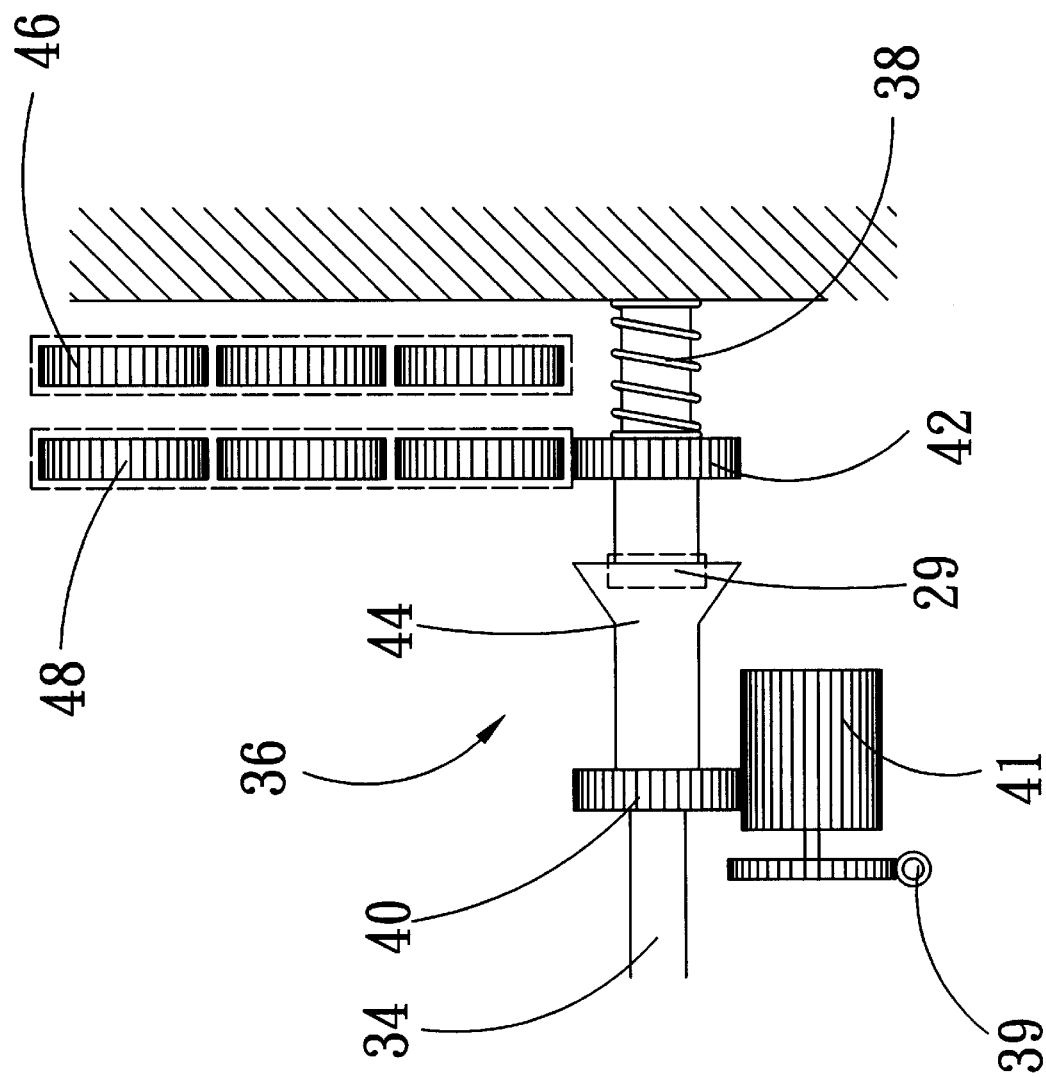
FIG. 7 is an illustrative diagram of the switch mechanism in FIG. 3.

(1) Operations of the Switch Mechanism 32:

Please refer to FIGS. 5 to 7. FIG. 5 is a perspective view of the switch mechanism 32 with the lid 28 at the "on" position. FIG. 6 is a perspective view of the switch mechanism 32 with the lid 28 at the "off" position. FIG. 7 is an illustrative diagram of the switch mechanism 32.

The switch mechanism 32 comprises a rotating axle 34 fixed on the upper casing 20, a switch 36 rotationally installed on the rotating axle 34, and an elastic device 38 for pushing the switch 36 toward one side of the rotating axle 34. The switch 36 comprises a first gear 40 for connecting the motor, a second gear 42 for moving the automatic document feeder 26 or the light source, a cone-shaped wheel 44 interacting with the flange 29 of the lid 28 to move the switch 36 on the rotating axle 34, a first power transmitter 46 for transmitting the power output of the motor to the light source, and a second power transmitter 48 for transmitting the power output of the motor to the automatic document feeder 26. The image scanner 10 further comprises a spiral rod 39 electrically connected with the motor, and a third gear 41 installed between the spiral rod 39 and the first gear 40. The power output of the motor will be transmitted to the first gear 40 through the spiral rod 39 and the third gear 41, and then transmitted to the automatic document feeder 26 or the light source through the second gear 42.

When the lid 28 is switched to the "on" position as shown in FIGS. 5 and 7, the flange 29 of the lid 28 will move away from the cone-shaped wheel 44 of the switch 36, and the elastic device 38 will push the second gear 42 to engage with the second power transmitter 48 so that the power output of the motor will be transmitted to the automatic document feeder 26. When the lid 28 is switched to the "off" position as shown in FIG. 6, the flange 29 of the lid 28 will press the cone-shaped wheel 44 of the switch 36 to compress the elastic device 38 so that the second gear 42 can be moved to engage with the first power transmitter 46 thus transmitting the power output of the motor to the light source.

Figure 8:
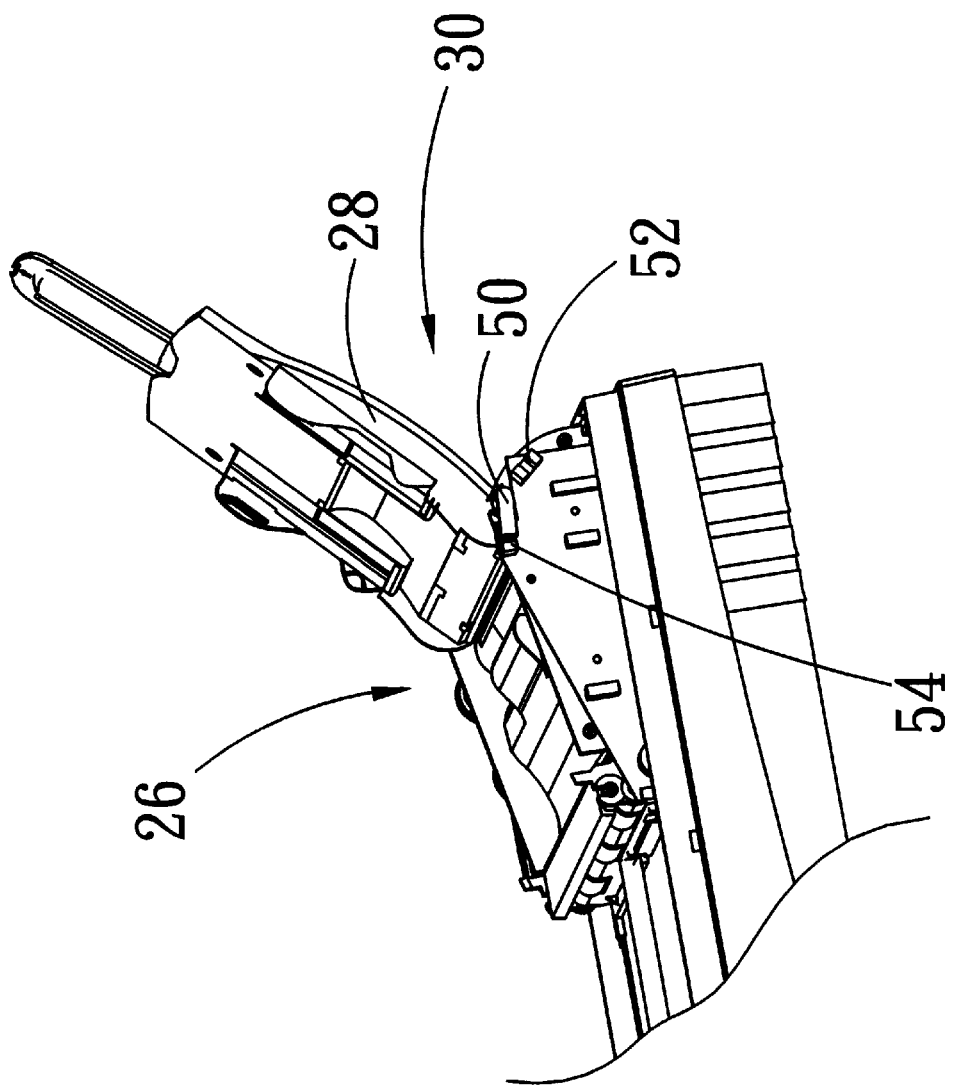
FIG. 8 is a perspective view of the sensing device in FIG. 4.

(2) Operations of the Sensing Device 30:

Please refer to FIG. 8. FIG. 8 is a perspective view of the sensing device 30. The sensing device 30 comprises a cantilever 50, a first sensor 52, and a second sensor 54. The cantilever 50 is fixed on the lid 28 and can be rotated with the lid 28. The first and second sensors 52, 54 are both installed on the upper casing 20 for interacting with the cantilever 50.

When the lid 28 is switched to the "on" position, the cantilever 50 will shield the second sensor 54 which causes the sensing device 30 to detect that the lid 28 is at the "on" position, and the control circuit will move the scanning module to a position below the second part 18 of the transparent platform 14 so as to scan documents transmitted from the automatic document feeder 26. When the lid 28 is switched to the "off" position, the cantilever 50 will shield the first sensor 52 which causes the sensing device 30 to detect that the lid 28 is at the "off" position, and the control circuit will move the light source and the scanning module simultaneously to scan documents.

From the operations of the switch mechanism 32 and the sensing device 30, when the lid 28 is switched to the "on" position and the documents are fed through the automatic document feeder 26, the flange 29 of the lid 28 will move away from the cone-shaped wheel 44 of the switch 36, and the elastic device 38 will push the second gear 42 to engage with the second power transmitter 48 so that the power output of the motor can be transmitted to the automatic document feeder 26. During this time, the cantilever 50 will shield the second sensor 54 which causes the sensing device 30 to detect that the lid 28 is at the "on" position, and the control circuit will move the scanning module to a position below the second part 18 of the transparent platform 14 so as to scan documents transmitted from the automatic document feeder 26.

When the lid 28 is switched to the "off" position and documents are placed on the transparent platform 14, the flange 29 of the lid 28 will press the cone-shaped wheel 44 of the switch 36 to compress the elastic device 38 so that the second gear 42 can be moved to engage with the first power transmitter 46 thus transmitting the power output of the motor to the light source. During this time, the cantilever 50 will shield the first sensor 52 which causes the sensing device 30 to detect that the lid 28 is at the "off" position, and the control circuit will move the light source and the scanning module simultaneously to scan documents.

Compared with the prior art image scanner, the image scanner 10 comprises an automatic document feeder 26 and a moveable light source, and uses a sensing device 30 to detect the position of a lid 28. The image scanner 10 further uses a switch mechanism 32 to control the power output of the motor. Moreover, the position of the lid 28 can be switched to scan-opaque documents or transparent documents without additional locating devices to locate transparent documents thus making the image scanner 10 multifunctional and easy to use.

Those skilled in the art will readily observe that numerous modifications and alterations of the device may be made while retaining the teachings of the invention. Accordingly, the above disclosure should be constructed as limited only by the metes and bounds of the appended claims.

What is claimed is:

1. An image scanner comprising:
    a lower casing having a lower transparent platform on its top for placing a document to be scanned wherein the lower transparent platform can be divided into two separate parts, namely a first part and a second part;
    a scanning module moveably installed inside the lower casing for scanning the document;
    an upper casing rotationally connected to the lower casing and having an upper transparent window on its bottom wherein when the upper transparent window of the upper casing is physically attached to the lower transparent window of the lower casing, the upper transparent window is positioned above the first part of the lower transparent platform;
    a light source moveably installed inside the upper casing and placed above the upper transparent window for providing back light to the document;
    an automatic document feeder installed inside the upper casing for carrying documents to be scanned through the second part of the lower transparent platform wherein the automatic document feeder comprises a lid rotationally installed on the upper casing and a sensing device for detecting the position of the lid; and
    a control circuit for controlling operations of the image scanner;
    wherein when the control circuit senses that the lid is at an "on" position through the-sensing device, the scanning module will be moved to a position under the second part of the lower transparent platform such that the documents carried through the second part of the lower transparent platform by the automatic document feeder can be scanned, and when the control circuit senses that the lid is at an "off" position, the light source and the scanning module will be moved under the control of the control circuit to scan a document placed on the first part of the lower transparent platform.

2. The image scanner of claim 1 wherein the automatic document feeder comprises a motor for moving the document to be scanned and the light source.

3. The image scanner of claim 2 wherein the automatic document feeder comprises a switch mechanism for switching the power output of the motor wherein when switched to the "on" position, the lid will actuate the switch mechanism to transmit the power output of the motor to the automatic document feeder to carry the documents to be scanned through the second part of the lower transparent platform, and when switched to the "off" position, the lid will actuate the switch mechanism to transmit the power output of the motor to the light source.

4. The image scanner of claim 3 wherein the lid comprises a flange installed on one side for actuate the switch mechanism, and the switch mechanism comprises:
    a rotating axle fixed on the upper casing;
    a switch rotationally installed on the rotating axle; and
    an elastic device for pushing the switch toward one side of the rotating axle, the switch comprising:
    a first gear for connecting the motor;
    a second gear for moving the automatic document feeder or the light source; and
    a cone-shaped wheel interacting with the flange of the lid to move the switch on the rotating axle;
    wherein when the first gear of the switch is driven by the motor, the second gear of the switch will also be driven so that the power output of the motor is transmitted to the automatic document feeder or the light source, wherein when the lid is switched to the "on" position, the flange of the lid will actuate the cone-shaped wheel of the switch to connect the second gear with the automatic document feeder for transmitting the power output of the motor to the automatic document feeder, and wherein when the lid is switched to the "off" position, the flange of the lid will actuate the cone-shaped wheel of the switch again to connect the second gear with the light source for transmitting the power output of the motor to the light source.

5. The image scanner of claim 4 wherein when the lid is switched to the "off" position, the flange of the lid will press the cone-shaped wheel of the switch to compress the elastic device so that the second gear on the rotating axle can be moved to connect the second gear with the light source, and wherein when the lid is switched to the "on" position, the flange of the lid will move away from the cone-shaped wheel of the switch, and the elastic device will push the switch back and connect the second gear with the automatic document feeder.

6. An image scanner comprising:
    a lower casing having an lower transparent platform on its top for placing a document to be scanned wherein the lower transparent platform can be divided into two separate parts, namely a first part and a second part;
    a scanning module moveably installed inside the lower casing for scanning the document;
    an upper casing rotationally connected to the lower casing and having an upper transparent window on its bottom wherein when the upper transparent window of the upper casing is physically attached to the lower transparent window of the lower casing, the upper transparent window is positioned above the first part of the lower transparent platform;
    a light source moveably installed inside the upper casing and placed above the upper transparent window for providing back light to the document;
    an automatic document feeder installed inside the upper casing for carrying documents to be scanned through the second part of the lower transparent platform and comprising:
        a lid rotationally installed on the upper casing;
        a motor for moving the documents to be scanned or the light source; and
        a switch mechanism for switching the power output of the motor;
        wherein when switched to an "on" position, the lid will actuate the switch mechanism to transmit the power output of the motor to the automatic document feeder so that the documents to be scanned can be carried to the second part of the transparent platform, and when switched to an "off" position, the lid will actuate the switch mechanism again to transmit the power output of the motor to the light source so that the light source can be driven to work with the scanning module to scan the document placed on the first part of the lower transparent platform.

7. The image scanner of claim 6 wherein the lid comprises a flange installed on one side for actuate the switch mechanism, and the switch mechanism comprises:
   a rotating axle fixed on the upper casing;
   a switch rotationally installed on the rotating axle; and
   an elastic device for pushing the switch to one side of the rotating axle, the switch comprising:
      a first gear for connecting the motor;
      a second gear for moving the automatic document feeder or the light source; and
      a cone-shaped wheel for interacting with the flange of the lid to move the switch on the rotating axle;
      wherein when the first gear of the switch is driven by the motor, the second gear of the switch will be driven by the first gear to transmit the power output of the motor to the automatic document feeder or the light source, wherein when the lid is switched to the "on" position, the flange of the lid will actuate the cone-shaped wheel of the switch to connect the second gear with the automatic document feeder for transmitting the power output of the motor to the automatic document feeder, and wherein when the lid is switched to the "off" position, the flange of the lid will actuate the cone-shaped wheel of the switch again to connect the second gear with the light source for transmitting the power output of the motor to the light source.

8. The image scanner of claim 7 wherein when the lid is switched to the "off" position, the flange of the lid will press the cone-shaped wheel of the switch to compress the elastic device and move the second gear on the rotating axle to connect the second gear with the light source, and wherein when the lid is switched to the "on" position, the flange of the lid will move away from the cone-shaped wheel of the switch, and the elastic device will push the switch back to connect the second gear with the automatic document feeder.

* * * * *